(12) United States Patent
Kitagawa

(10) Patent No.: US 6,820,166 B2
(45) Date of Patent: Nov. 16, 2004

(54) SYSTEM FOR ASSOCIATING A FUNCTION TO AN ENTITY CAPABLE OF COMMUNICATING DATA ACROSS AN INTERFACE

(75) Inventor: Masayuki Kitagawa, Irvine, CA (US)

(73) Assignee: Mitsumi Electric Co., Ltd., Tokyo (JP)

(*) Notice: Subject to any disclaimer, the term of this patent is extended or adjusted under 35 U.S.C. 154(b) by 475 days.

(21) Appl. No.: 09/757,314

(22) Filed: Jan. 9, 2001

(65) Prior Publication Data

US 2002/0129180 A1 Sep. 12, 2002

(51) Int. Cl.⁷ .............................................. G06F 13/00
(52) U.S. Cl. ..................................... 710/316; 710/313
(58) Field of Search ................................. 710/8, 12, 14, 710/15, 16, 62, 100, 313, 316; 455/556.1, 557

(56) References Cited

U.S. PATENT DOCUMENTS 6,141,719 A * 10/2000 Rafferty et al. ............. 710/316
6,516,205 B1 * 2/2003 Oguma ....................... 455/557

* cited by examiner

Primary Examiner—Khanh Dang
(74) Attorney, Agent, or Firm—Knobbe Martens Olson & Bear LLP

(57) ABSTRACT

The present invention relates to a method and system for selecting one of the two functions. The system in accordance with one embodiment of the invention includes a first entity that has a host function and a device function, and a second entity that has at least one of the two functions. The system further includes a detector and a selecting mechanism. The detector detects the second entity when the first entity is connected to the second entity. The selecting mechanism responds to an output of the detector and selects one out of the host and device functions of the first entity.

13 Claims, 12 Drawing Sheets

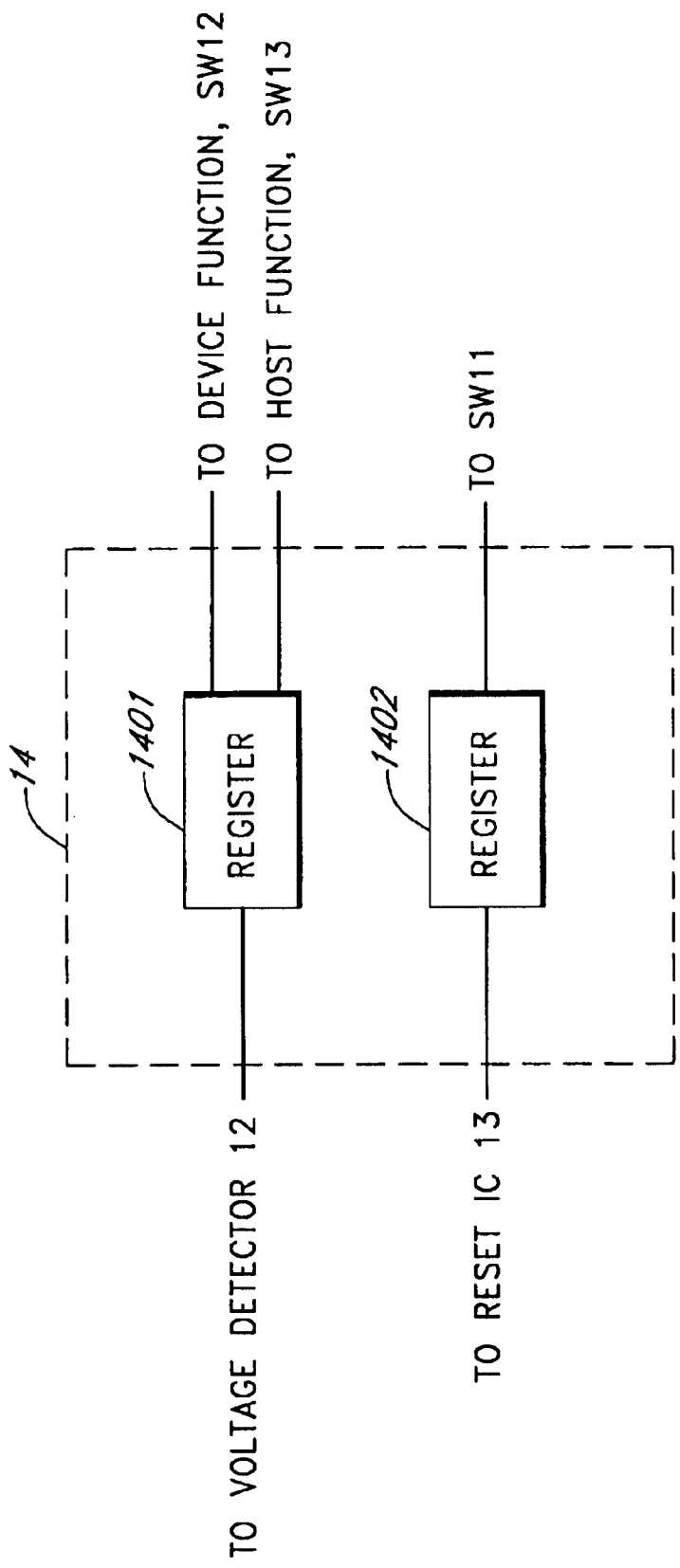

SYSTEM FOR ASSOCIATING A FUNCTION TO AN ENTITY CAPABLE OF COMMUNICATING DATA ACROSS AN INTERFACE

BACKGROUND OF THE INVENTION

1. Field of the Invention

The invention relates to an apparatus and method for selecting one out of two functions, and particularly to an apparatus and method for selecting between either a host function or a device function.

2. Description of the Related Art

With the advances of digital technology, digital system such as personal computers (PCs), digital cameras, printers, and cell phones have been in wide use. The PC may be connected to a printer for printing image data that are stored in the PC. A digital camera may also be connected to the printer so that data in the camera can be printed as images. Further, the digital camera may be connected to the PC so that data in the camera can be transferred to the PC in order for the data already stored in the camera to be edited. In this way, the systems are interconnected for data transfer. Interconnections between various types of systems are presumed to increase from now on.

FIG. 1 illustrates a host 1 and a device 2 that are connected to each other through an interface. The connection may be made to carry out high-speed data transfer. For this case, for example, the host 1 is a PC, and the device 2 may be, for example, one of a digital camera, cell phone, printer, or audio player. The interface may be a USB (Universal Serial Bus). The host 1 has only a host function, sends instructions, and sends and receives data. The device 2, on the other hand, has only a device function, works on instructions from the host 1, and sends and receives data. The interface can equivalently be expressed as a line 1, a line 2, and the ground.

The host 1, seen from a dotted line shown as a centerline, can be expressed as, including the interface, an equivalent circuit 1'. The equivalent circuit comprises a combination of a power supply Vs, a transceiver 3, and two resistors. The power supply Vs may be, for example, 5.0 volts (V). The transceiver 3 is connected between the line 1 and the line 2, and controls sending and receiving signals. One of the resistors is connected between the line 1 and the ground and the other is connected between the line 2 and the ground. Both of the resistors may be, for example, 15 kiloohms (kΩ).

The device 2, seen from the dotted line, can be expressed as, including the interface, an equivalent circuit 2'. The equivalent circuit 2 comprises a transceiver 4 and a resistor. The transceiver 4 is connected between the line 1 and the line 2. The resistor of 1.5 kΩ is pulled up to a power supply of 3.3 V from the line 2. On the line 2, the voltage of 3.0 V is detected by dividing 3.3 V by 15 kΩ/( 1.5 kΩ+15 kΩ).

FIG. 2 illustrates a host 5 and a device 6 that are connected to each other through an interface. The connection may be made to conduct low-speed data transfer. The host 5 and interface are the same as those explained in FIG. 1. The device 6 may be, for example, a mouse, or keyboard. An equivalent circuit 5' for the host 5 comprises a transceiver 7 and two resistors of 15 kΩ. The connection of the components is the same as that in FIG. 1. The device 6 is expressed as an equivalent circuit 6' of a transceiver 8 and a resistor. The resistor of 1.5 kΩ is pulled up to a voltage supply of 3.3 V from the line 1. On the line 1, the voltage of 3.0 V is obtained by dividing 3.3 V by 15 kΩ/(1.5 kΩ+15 kΩ).

However, under the systems shown in the figures, the host has a host function only and the device, regardless of high or low data transfer, has a device function only. This causes users inconvenience since the host cannot be used as a device and the device cannot be used as a host. Those apparatuses lack versatility. Thus, there is a need to realize versatility of one apparatus and make full use of its functions.

SUMMARY OF THE INVENTION

One aspect of the invention is directed to an apparatus for selecting one out of two functions. The apparatus comprises a first entity having a first function, a second function, at least one detector and a function select mechanism; a second entity having at least one function of the first and the second function; and an interface for connecting the first entity and second entity, the interface connected to the at least one detector; whereby the at least one detector detects a function of the second entity when connected to the first entity, and the function select mechanism selects one out of the first and second functions in the first entity in response to an output of the at least one detector corresponding to the detected function.

Another aspect of the invention is directed to an apparatus for selecting one out of two functions. The apparatus comprises a first entity having a first function, a second function, at least one detector and a function select mechanism; a second entity having one function of the first and the second function; and an interface for connecting the first entity and second entity, the interface connected to the at least one detector; whereby the at least one detector detects a function of the second entity when connected to the first entity, and the function select mechanism selects one out of the first and second functions in the first entity in response to an output of the at least one detector corresponding to the detected function.

Still another aspect of the invention is directed to an apparatus for selecting one out of two functions. The apparatus comprises a first entity having a first function, a second function, a detector and a function select mechanism; a second entity having one function of the first and the second function; and an interface for connecting the first entity and second entity, the interface connected to the detector; whereby the detector detects a function of the second entity when connected to the first entity, and the function select mechanism selects one out of the first and second functions in the first entity in response to an output of the detector corresponding to the detected function.

Further still another aspect of the invention is directed to a method of selecting one out of a first function and a second function a first entity has, with respect to a second entity that has at least one of the first and second functions. The method comprises activating a first power source to the first entity; connecting the first entity to the second entity via an interface; detecting at least one voltage on the interface by connecting a first resistor between the interface and a second power source; determining first if the detected voltage is over a threshold; if so, connecting a second resistor between the interface and the ground; detecting a divided voltage derived from the second power source and a ratio of the second resistance to the second resistance plus the first resistance; determining second if the detected divided voltage is over the threshold; if so, selecting the first function; if the detected voltage is not over the threshold at the first determination, deactivating the first power source; connecting a third resistor between the interface and the second power source; waiting for a specified packet to be sent; if the packet is received, selecting the second function.

Another aspect of the invention is directed to a method of selecting one out of a first function and a second function a first entity has, with respect to a second entity that has one of the first and second functions. The method comprises providing a power source to the first entity; connecting the first entity to the second entity via an interface; detecting at least one voltage on the interface; determining if the detected voltage is over a threshold; if so, selecting the first function; and if not, selecting the second function.

BRIEF DESCRIPTION OF THE DRAWINGS

FIG. 4B illustrates one embodiment of the function select logic shown in FIG. 3.

DETAILED DESCRIPTION OF CERTAIN INVENTIVE EMBODIMENTS

Figure 3:
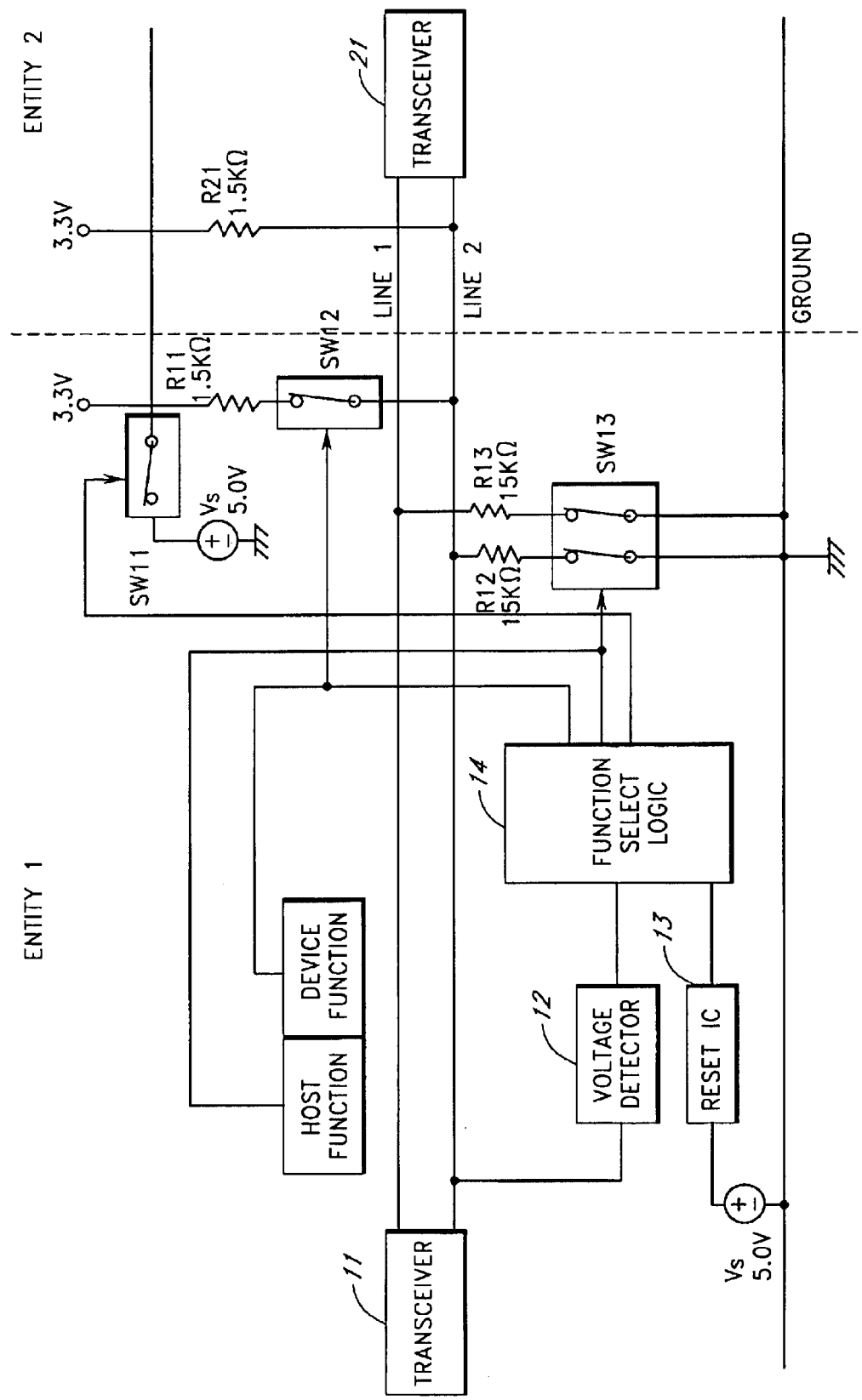
FIG. 3 illustrates a first embodiment of a system for selecting a host function of a first entity that is connected to a second entity having a device function, in accordance with the invention.

FIG. 3 illustrates one embodiment of a system for selecting a host function of a first entity that is connected with a second entity having a device function, in accordance with the invention. The figure shows an arrangement when an entity 1 is connected to an entity 2 via an interface and a host function of the first entity 1 is selected. The entity 1, entity 2 and interface can each be expressed as an equivalent circuit.

The entity 1 includes both a host function and a device function that can be realized by software. The entity 1 may be, for example, a digital camera. The digital camera may be, for example, DC3800 Digital Camera available from Kodak, DC4800 Zoom Digital Camera available from Kodak, or Photo PC 650 Digital Camera available from Epson. The entity 1 further includes a transceiver 11, switches SW11, SW12, and SW13 that is of a double-throw type, a voltage detector 12, a power supply Vs, a reset IC 13, a function select logic 14, and resistors R11, R12, and R13. The transceiver 11 may be, for example, ISP 1501 USB 2.0 Transceiver available from Phillips, or M-USB2TC1 USB 2.0 Transceiver available from Lucent Technologies. The reset IC 13 may be, for example, PTC 573 System Reset IC available from Mitsumi Electric Co., Ltd. The power supply Vs may be, for example, 5.0 V. The resistors R11, R12, and R13 are 1.5 kΩ, 15 kΩ, and 15 kΩ, respectively. The interface is expressed as a line 1, a line 2 and the ground.

The entity 2 may be a printer that has a device function only. The entity 2 includes a transceiver 21 and a resistor R21. The resistor R21 is 1.5 kΩ and is pulled up to the voltage supply of 3.3 V. The transceivers 11 and 21 are identical, send and receive signals, and control the lines 1 and 2. The interface may be a USB (Universal Serial Bus).

The transceiver 11 is connected to the lines 1 and 2. The voltage detector 12 is connected to the line 2 at the input for detecting the entity 2 that is high speed or low speed, and is connected to the function select logic 14 at the output. The function select logic 14 is connected to the switches SW11–SW13, and the host and device functions. SW11 connects the power supply line to provide the power of 5.0 V to the entity 2 when actuated, SW12 connects the line 2 to the power supply of 3.3 V when actuated. One of the terminals of SW13 is connected to the line 1 through R13, and the other, to the line 2 through R12. The two opposite terminals are connected to the ground. The transceiver 21 is connected to the lines 1 and 2. The line 2 is pulled up to the power line of 3.3 V via R21.

Figure 4A:
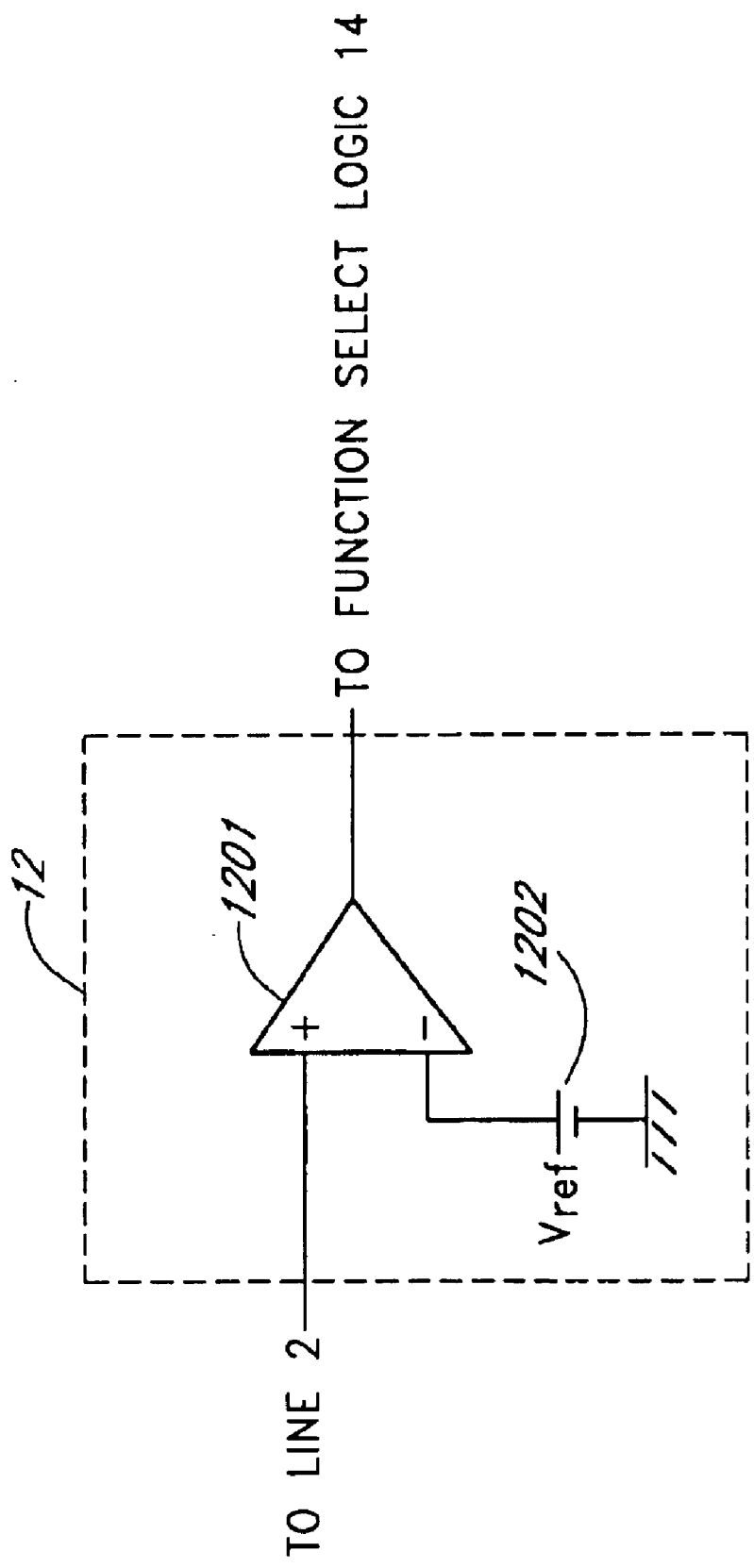
FIG. 4A illustrates one embodiment of the voltage detector shown in FIG. 3.

FIG. 4A shows one embodiment of the voltage detector 12. The detector 12 includes a comparator 1201, with a non-inverting terminal + connected to the line 2 and an inverting terminal − connected to a reference voltage 1202. The comparator 1201 may be, for example, LM111 Voltage Comparator available from National Semiconductor. The voltage 1202 is, generally, half of 3.3 V, i.e., 1.65 V. The output of the comparator 1201 is connected to the function select logic 14. The comparator 1201 converts an analog input to a digital voltage of a high or low level.

FIG. 4B shows one embodiment of the function select logic 14. The logic 14 comprises two registers 1401 and 1402. The register 1401 is connected to the voltage detector 12 at the input. One output of the register 1401 is connected to the device function and SW12; the other output is connected to the host function and SW13. The two outputs of the register 1401 are complementary. That is, when one output is high, the other output is low, and vice versa. The register 1402 is connected to the reset IC 13 at the input. The output of the register 1402 is connected to SW 11. Both of the registers can be triggered by a rising edge of an input voltage. The registers 1401 and 1402 may be a flip-flop and hold an output level. The flip-flop may be, for example, SN74F74 D-type Flip-Flop available from Texas Instruments. Other embodiments of the function select logic 14 can be realized by, for instance, a field programmable gate array, a gate array, or a microprocessor. The field programmable gate array may be, for instance, XC9536XL FPGA available from Xilinx Inc., or EPF10K 100EQC240 available from Altera Corp. The gate array may be, for instance, CMOS-8, CMOS-9, both available from NEC, TC200, or TC220, both available from Toshiba. The microprocessor may be, for instance, μPD789104A available from NEC, H8/3062F available from Hitachi, or TMP91CW12 available from Toshiba. The embodiment of the microprocessor will be described hereinbelow.

Figure 5:
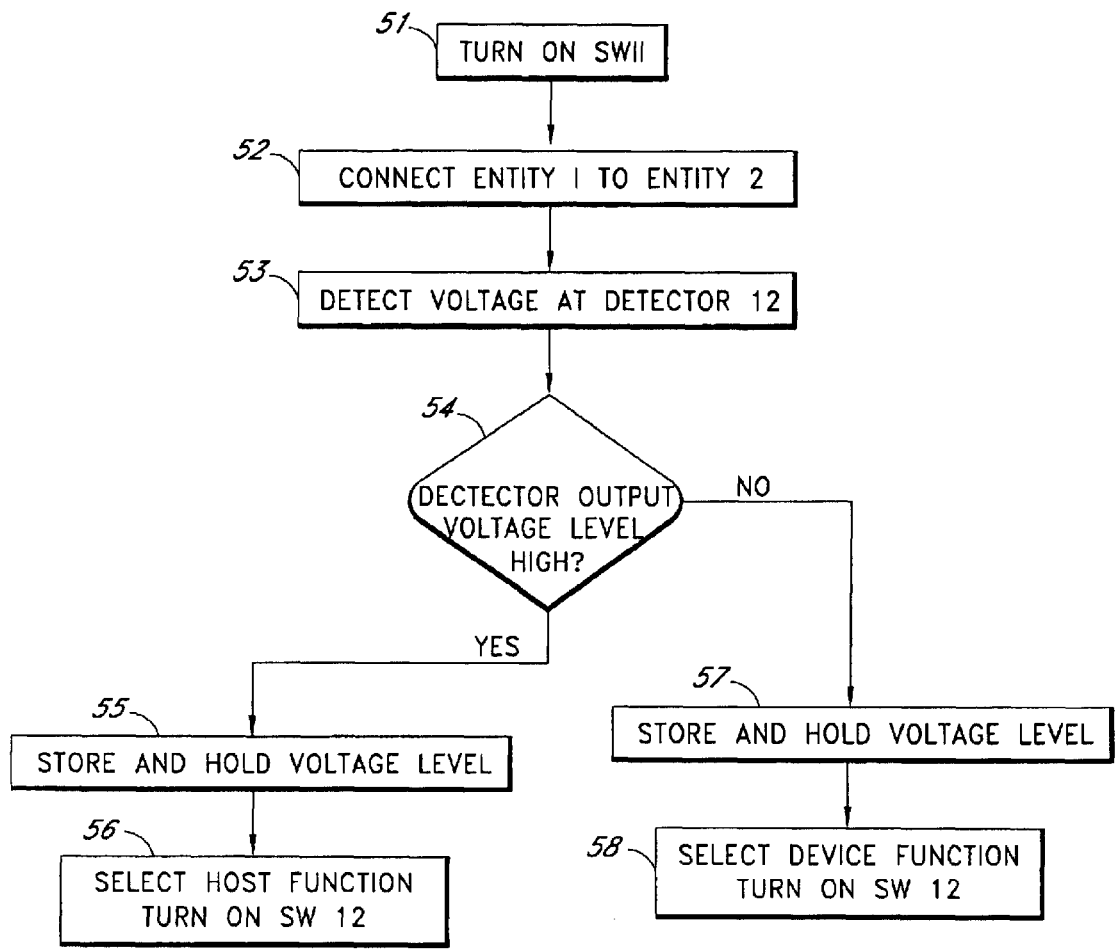
FIG. 5 is a flowchart illustrating a process of selecting a host function with respect to the first embodiment shown in FIG. 3.

FIG. 5 is a flowchart illustrating a process of selecting a host function with respect to the first embodiment shown in FIG. 3. Referring to FIGS. 3 and 5, operation of the first embodiment will be explained. When the power supply Vs is turned on, the reset IC 13 is triggered to be high at a rising edge of the power supply voltage. The output of the reset IC 13 triggers the register 1402 of the function select logic 14 to be high, where the output is held high. At step 51, SW 11 is turned on because of the high output level of the register 1402. At step 52, the entity 1 is connected to the entity 2. At the connection, the line 1 is at an open voltage and the line 2 is at 3.3 V.

At step 53, the voltage detector 12 detects the voltage 3.3 V at the line 2. At step 54, the voltage 3.3 V at the non-inverting terminal + is compared with the reference voltage 1.65 V at the inverting terminal − at the comparator 1201 in the voltage detector 12. Since the voltage of the + terminal is higher, the output of the comparator 1201 goes to a high voltage level and a digital high level is produced. The process goes to step 55 and does not go to steps 57 and 58. At step 55, the high level is stored and held at the register 1401 since the voltage at the line 2 can be zero, i.e., less than 1.65 V when data is transferred between the transceivers 11 and 21. At step 56, the high voltage level of the register 1401 turns on SW 13 and selects the host function.

Figure 1:
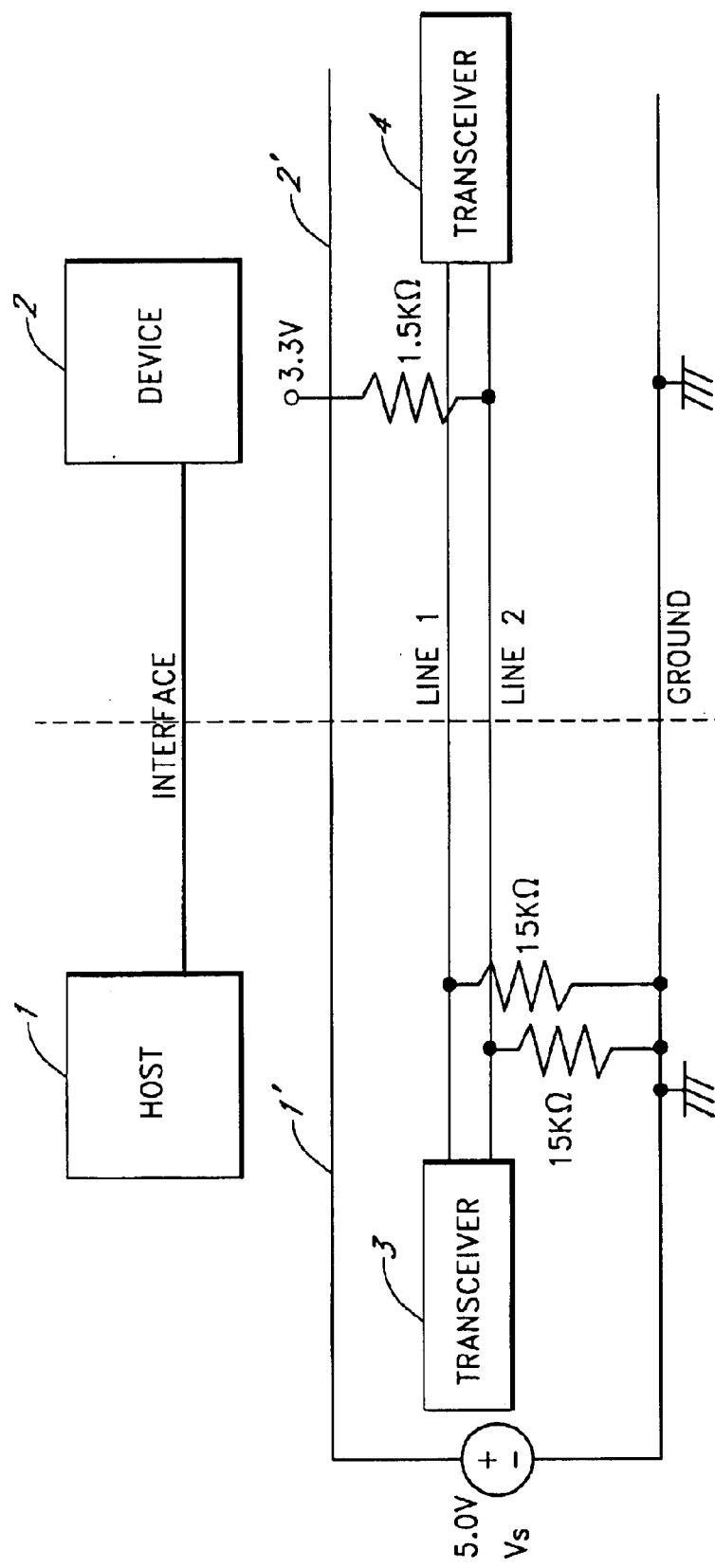
FIG. 1 illustrates a host and a device that are connected to each other for high-speed data transfer, with a line 2 pulled up to a power supply through a resistor.
Figure 2:
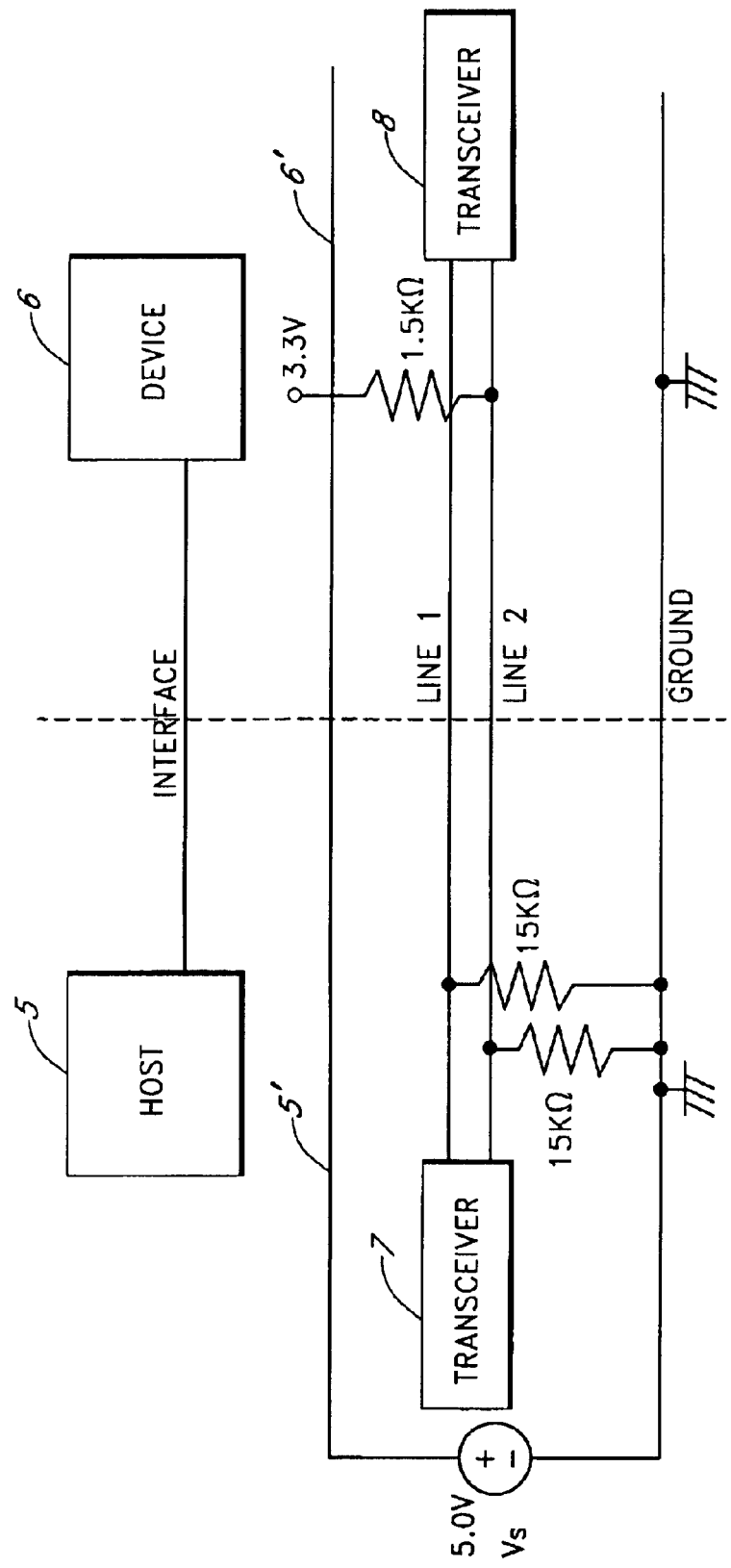
FIG. 2 illustrates a host and a device that are connected to each other for low-speed data transfer, with a line 1 pulled up to a power supply through a resistor.

Thus, the voltage detector 12 detects the voltage on the line 2, the entity 1 can detect the high-speed entity 2 as in FIG. 1. Since the voltage on the line 1 is not detected, any low-speed entity cannot be detected. For example, when the entity 1 is a digital camera and the entity 2 is a keyboard or mouse that is low-speed, the connection between the entities 1 and 2 cannot be established. However, there may be no need for those entities to be connected.

After selecting the host function, the entity 1 functions as a host and the entity 2 works as a device. In the case where the entity 1 is a digital camera and the entity 2 is a printer, when the digital camera sends the instructions, for example, to print an image stored in the camera, the printer receives the instructions and prints the image. SW13 functions as a terminator when data is sent or received between the transceivers 11 and 21.

Figure 6:
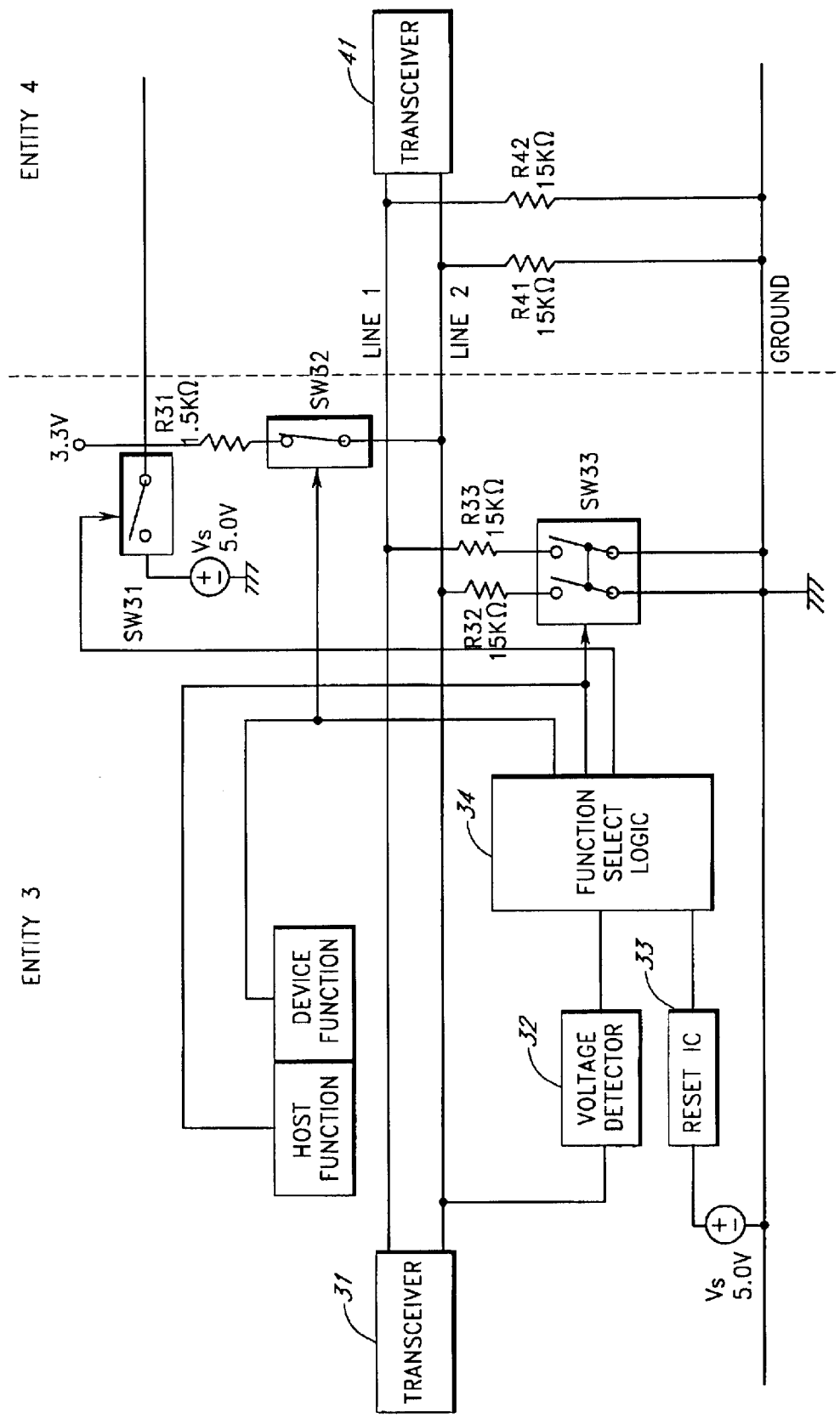
FIG. 6 illustrates a second embodiment of a system for selecting a device function of a third entity that is connected to a fourth entity having a host function, in accordance with the invention.

FIG. 6 illustrates a second embodiment of a system for selecting a device function of a third entity that is connected to a fourth entity having a host function in accordance with the invention. The figure shows an arrangement when an entity 3 is connected to an entity 4 and a device function is selected. The entity 3 is a device and the entity 4 is a host. The entity 3 may be, for example, a digital camera, and the entity 4 may be, for example, a PC.

The entity 3 has both a host function and a device function. The structure of the entity 3 is the same as that of the entity 1 except for the reference numerals attached to the components. Accordingly, an explanation of the structure and operation of the entity 3 is omitted. The entity 4 has a host function only and comprises a transceiver 41 and two resistors R41 and R42 connected thereto. The resistors, contrary to the entity of FIG. 3, are both connected to the ground.

Figure 7:
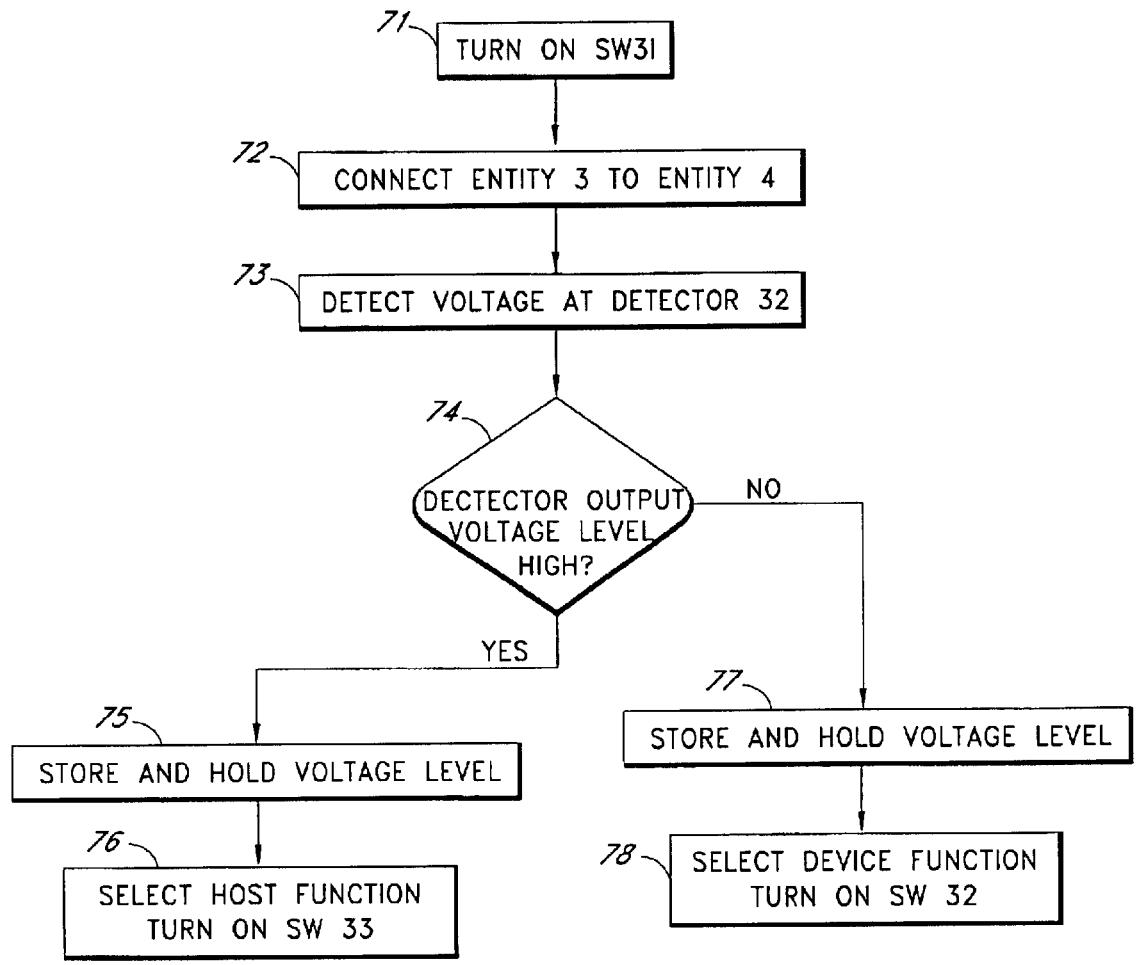
FIG. 7 is a flowchart illustrating a process of selecting a device function with respect to the second embodiment shown in FIG. 6.

FIG. 7 is a flowchart illustrating a process of selecting a device function with respect to the second embodiment shown in FIG. 6. Referring to FIGS. 6 and 7, operation of the second embodiment will be discussed. At step 71, a signal from the function select logic 34 turns on SW 31. Then, at step 72, the entity 3 is connected to the entity 4. The power supply Vs of 5.0 V is provided to the entity 4, but since the resistors R41 and R42, both 15 kΩ, are connected between lines 2 and 1, respectively, the voltages on the lines 1 and 2 are zero.

At step 73, 0 V on the line 2 is detected by a voltage detector 32. At step 74, it is determined whether the output of the detector 32 is a high or low level. Since the voltage on the line 2 is 0 V, the output goes to a low level. Accordingly, the process proceeds to step 77 and does not proceed to step 75. At step 77, the low level is stored and held by the function select logic 34.

At step 78, the low level at the output of the function select logic 34 selects a device function and activates SW32. SW34 has a role of letting the entity 4 know that the entity 3 has been detected. When the entity 3 is a digital camera and the entity 4 is a PC, if the PC sends the instruction, for example, to transfer an image in the camera to the PC, the camera receives the instruction and send the image to the PC.

Figure 8:
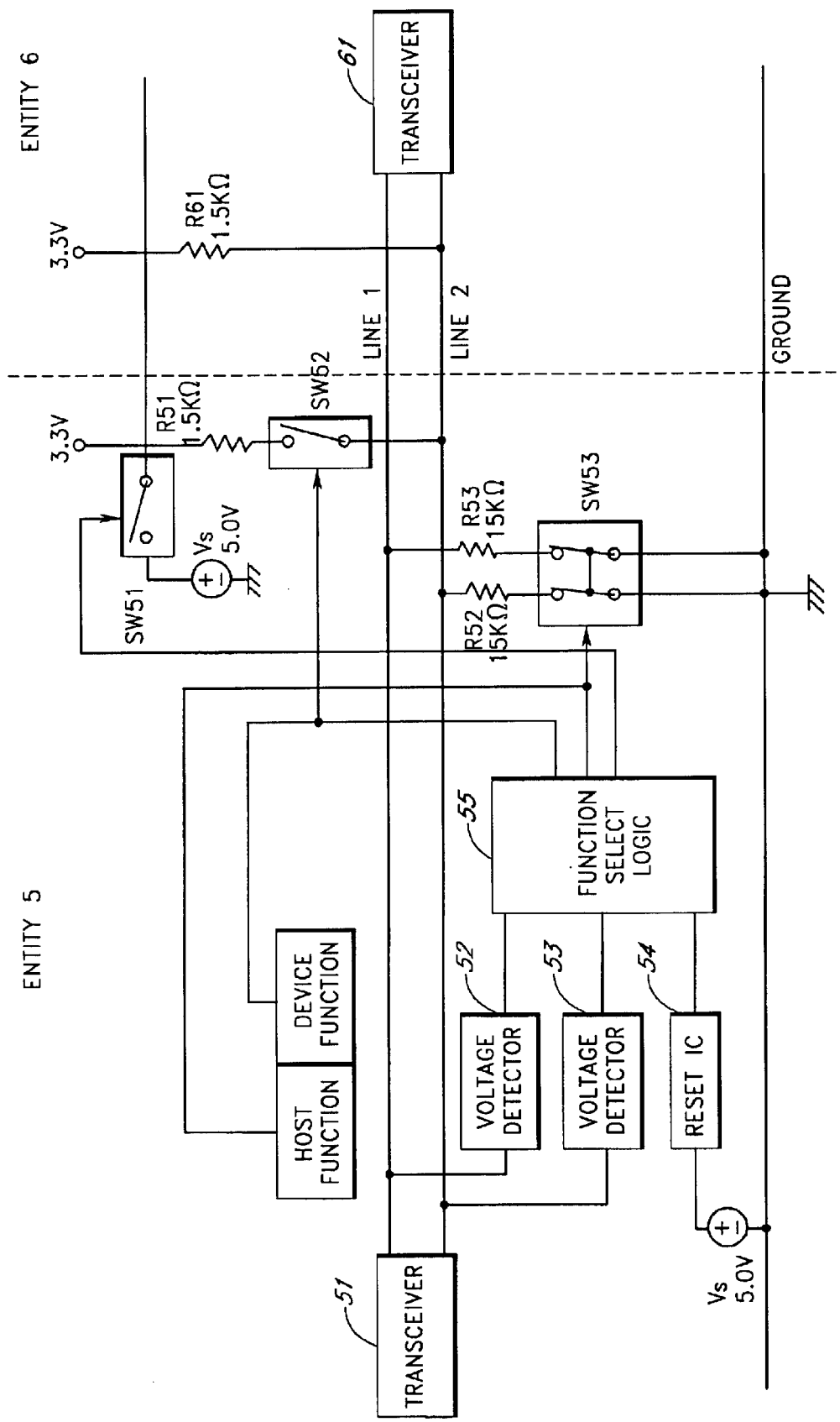
FIG. 8 illustrates a third embodiment of a system for selecting a host function of a fifth entity that is connected to a sixth entity having a device function, by the use of two detectors, in accordance with the invention.

FIG. 8 illustrates a third embodiment of a system for selecting a host function of a fifth entity that is connected with a sixth entity having a device function, by the use of two detectors in accordance with the invention. The figure shows a variation of FIG. 3, with one detector 12 in the entity 1 replaced by two detectors 52 and 53 in an entity 5. To receive two outputs from the detectors, a function select logic 55 is modified, too. Except for this and the reference numerals attached to the components, the structure of the entity 5 is the same as that of the entity 1 of FIG. 3. The structure of an entity 6 is the same as that of the entity 2 of FIG. 3, except for the reference numerals attached to the components. The entity 5, for example, may be a digital camera and the entity 6 may be a printer. Therefore, only the different structures are described.

The voltage detector 52 is connected to the line 1 and the voltage detector 53 is connected to the line 2. Both of the voltage detectors have the same structure, such as the one shown in FIG. 4B. Because the two outputs from the detectors 52 and 53 are supplied to the function select logic 55, the function select logic 55 has to have two inputs. Both of the outputs of the detectors 52 and 53 need to be held constant.

Figure 9:
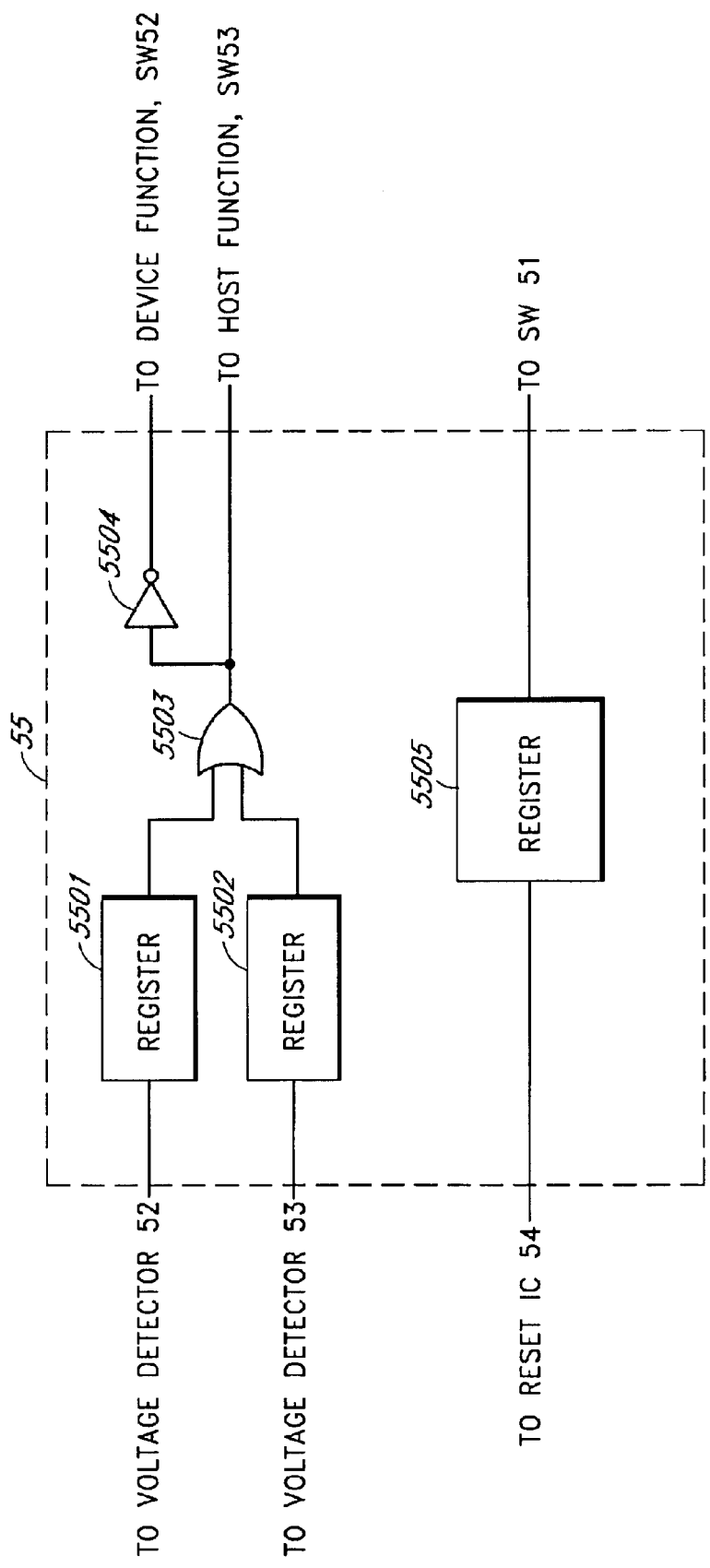
FIG. 9 illustrates a block diagram of the function select logic shown in FIG. 8.

FIG. 9 shows a block diagram of one embodiment of the function select logic 55 that satisfies the requirement. The function select logic 55 includes two registers 5501 and 5502, an OR gate 5503, an inverter 5504, and a register 5505. Since the function of the register 5505 is the same as that of the register 1402 of FIG. 4B, only an explanation of the difference between FIG. 9 and FIG. 4B is described herein. The input of the register 5501 is connected to the voltage detector 52; the input of the register 5502 is connected to the voltage detector 53. Both of the outputs from the registers 5501 and 5502 are input to the OR gate 5503. The output of the OR gate 5503 is applied to the host function and SW 53 and to the device function and SW 52 via the inverter 5404.

When the entity 5 is a digital camera and the entity 6 is a printer that has only a device function, an open voltage appears on the line 1 and 3.3 V on the line 2. The voltage detector 53 only detects the 3.3 V, and outputs a high level to the register 5502. The OR gate 5503 outputs a high level regardless the level of an output from the register 5501. The rest of the operation is the same as that in FIG. 3. Since the voltage detector 52 detects a low-speed entity and the voltage detector 53 detects a high-speed entity, the embodiment has the advantage that any speed entity can be detected.

Figure 10:
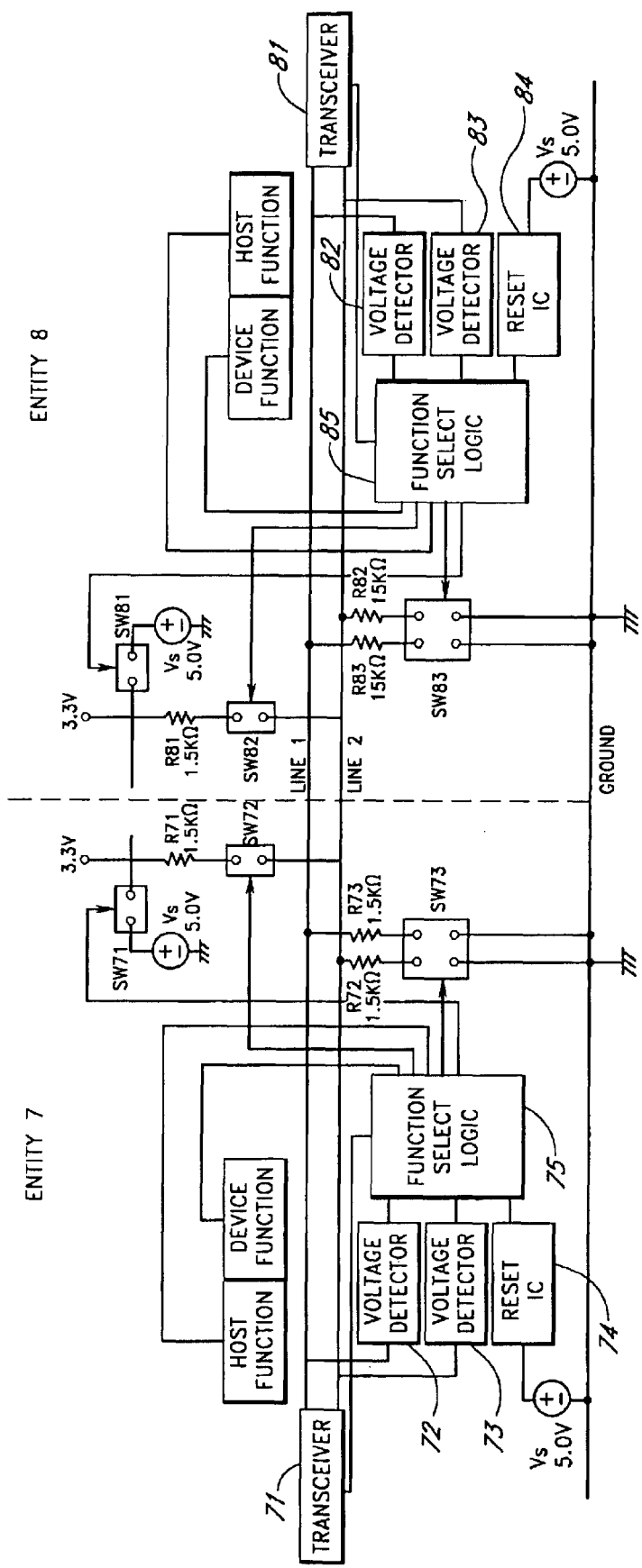
FIG. 10 illustrates a fourth embodiment of a system for selecting one of the two functions for each of a seventh entity and a eighth entity that are connected to each other, in accordance with the invention.

FIG. 10 illustrates a fourth embodiment of a system for selecting one of the two functions for each of an entity 7 and an entity 8 that are connected to each other, in accordance with the invention. The entity 7 and the entity 8 each have two functions, and have the same structure. Since the structure is the same, an explanation is made with respect to the entity 7 hereinbelow.

The entity 7 is identical to the entity 5 in FIG. 8 except that a function select logic 75 is a microprocessor or microcontroller that is connected to a transceiver 71 and to each of the controlled components such as SW 71–73. In the embodiment, the voltage detector 72 is connected to the line 1 for detecting a low-speed entity, and the voltage detector 73 is connected to the line 2 for detecting a high-speed entity. But, the detector 73 for high-speed detection may only be used. The entities 7 and 8 may both be a digital camera.

Figure 11:
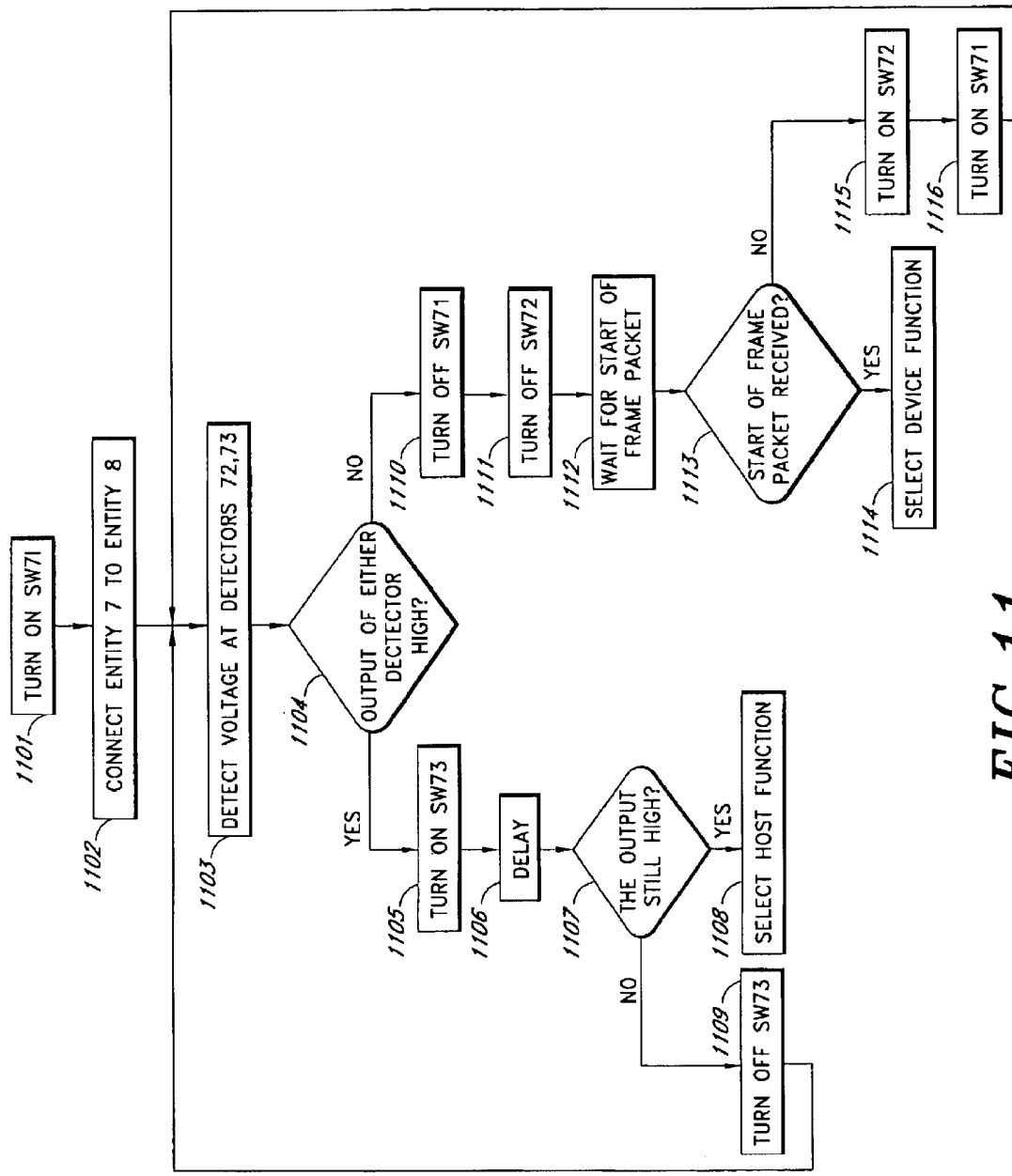
FIG. 11 is a flowchart illustrating a process of selecting one of the functions with respect to a seventh entity and an eighth entity shown in FIG. 10.

FIG. 11 is a flowchart illustrating a process of selecting one of the functions of the entity 7 and entity 8 shown in FIG. 10. Referring to FIGS. 10 and 11, operation of the fourth embodiment will be discussed. It is assumed that the power supply Vs is activated first on the entity 7. Activating the power works a reset IC 74, which, at step 1101, causes SW 71 to turns on. At step 1102, the entity 7 is connected to the entity 8. At step 1103, the detectors 72 and 73 detect the voltages on the lines 1 and 2, respectively, when the entity 8 is powered and SW 82 is closed. The detectors 72 and 73 output either a high or low level.

The function select logic 75 (in one embodiment, a microprocessor) senses the output level from the detectors 72 and 73. At step 1104, the function select logic 75 determines whether the output of either detector is high. If the output is high, the process proceeds to step 1105, where the function select logic 75 turns on SW 73. At step 1106, the function select logic 74 waits for a short period of time such as 1 msec, i.e., delay, because SW 73 has to be securely turned on to prevent it from bouncing.

At step 1107, the function select logic 75 determines whether the output of either detector is still high to confirm that the entity 8 is a host. If it is high, the process proceeds to step 1108, at which the function select logic 75 selects the host function. If the output of either detector is not high, the process goes to step 1109, where the function select logic 75 turns off SW 73. The process returns back to step 1103 to detect the voltages at the detectors 72 and 73 again.

At step 1104, if the function select logic 75 does not determine that the output of either detector is high, the process proceeds to step 1110, where the function select logic 75 turns off SW 71. Then, at step 1111, the function select logic 75 turns SW 72 on. At step 1112, the transceiver 71 waits for one packet, Start of Frame Packet, to be sent from a transceiver 81. The Start of Frame Packet is sent at an interval of, for example, 1 msec. At step 1113, the function select logic 75 decides whether the Start of Frame Packet is received to confirm that the entity 8 is a device. If the function select logic 75 decides it is, at step 1114 the function select logic 75 selects the device function.

At step 1113, if the function select logic 75 decides that the Start of Frame Packet is not received, the process moves to step 1115, where SW 72 is deactivated. At step 1116, SW 71 is activated. Then the process goes back to step 1103.

Since the function select logics 75 and 85 are microprocessors, the microprocessors use the following control codes as one example to carry out the flow chart shown in FIG. 11:

```
/**
 *
 * Logic Definition
 *
 **/
#define     UNSELECTED    0
#define     SELECTED      1
#define     SW_OFF        0
#define     SW_ON         1
/**
 *
 * I/O Port Address Definition
 *
 **/
#define Power_Supply_SW (*(volatile unsigned char *)0x8010) /*
USB +5V Power Supply to Outside */
#define     Pull_Up_SW      (*(volatile unsigned char *)0x8011) /*
Pull Up Resister Switch for Device */
#define     Pull_Down_SW    (*(volatile unsigned char *)0x8012) /*
Pull Down Resister Switch for Host */
#define     Volt_Detect_1   (*(volatile unsigned char *)0x8020) /*
USB Data Line 1 Voltage Detector */
#define     Volt_Detect_2   (*(volatile unsigned char *)0x8021) /*
USB Data Line 2 Voltage Detector */
/**
 *
 * USB Chip Register Address and Bit Map Definition
 *
 **/
#define     Packet_Detect   (*(volatile unsigned char *)0xA020) /*
USB Packet Register */
#define     SOF_Bit         0x80 /* Start of Packet Detect Bit */
/**
 *
 * Wait For Start of Frame (SOF) Definition
 *
 **/
#define     UNDETECTED    0
#define     DETECTED      1
#define     Wait_SOF_Time   0x1000
inline int
receive_sof (void)
{
    for(int i = 0; i < Wait_SOF_Time; i++)
       if (Packet_Detect & SOF_Bit == SOF_Bit)
          return DETECTED;
       return UNDETECTED;
}
/**
 *
 * Dummy Wait Time Definition
 *
 **/
#define     Wait_Time     0x100
inline void
dummy_wait (void)
{
    for(int    i = 0; i < Wait_Time; i++);    /* Dummy Wait */
}
/**
 *
 * Definition of usb_h_d_select function
 *
 * After System Reset and the microprocessor reset,
 * this function should be called immediately.
 *
 **/
#define DEVICE_FUNC_SEL 0
#define     HOST_FUNC_SEL    1
int
usb_h_d_select (void)
{
    Power_Supply_SW = SW_ON;   /* USB +5V Power Supply On */
    for( ; ; ) {     /* endless loop until either Device or Host
selected */
        if(Volt_Detect_1 || Volt_Detect_2) { /* The opponent likely
```

-continued

```
Device */
        Pull_Down_SW = SW_ON;   /* Pull Down Resister Switch
On */
        dummy_wait( );      /* Dummy Wait */
        if(Volt_Detect_1 || Volt_Detect_2) /* The opponent
still Device? */
            return HOST_FUNC_SEL; /* Yes, the opponent
is Device. */
                                      /*   So,
this must be selected as Host */
                                 /*
Completed */
        else /* No, the opponent likely Host */
            Pull_Down_SW = SW_OFF; /* Pull Down Resister
Switch Off */
                                 /*   Repeat
the checking */
        }
        else {    /* The oponent likely Host */
            Power_Supply_SW = SW_OFF;  /*   USB +5V Power
Supply Off */
            Pull_Up_SW = SW_ON;     /*  Pull Up Resister Switch
On */
            if(receive_sof( ) == DETECTED) /* Start of Frame
detected? */
                return DEVICE_FUNC_SEL;    /*   Yes, it
detected, the opponet is Host */
                                 /*
This must be selected as Device */
                                 /*
Completed */
            else {    /* No, the opponent may be Device */
                Pull_Up_SW = SW_OFF;  /*  Pull Up Resister
Switch Off */
                Power_Supply_SW = SW_ON;   /* USB +5V Power
Supply On */
                                 /*
Repeat the checking */
            }
        }
    }
}
```

In addition to the embodiments described above, the invention includes other entity combinations. A digital camera may be selected as a host and a memory may be selected as a device. When the camera sends out the instruction to store the images in the camera, the memory stores the images.

A PC can be selected as a host and a cellphone can be selected as a device. The PC transfers data to the cellphone, for example, names, addresses, and phone numbers.

A cellphone can be selected as a host and a printer can be selected as a device. When the cellphone sends the instructions to print a list of names in the cell phone, the printer prints the names.

A cellphone may be selected as a host and a memory can be selected as a device. When the cellphone sends out the instructions to store names of parties and conversations held with parties (i.e., voice data), the memory stores the names and conversations.

Although described above in connection with the particular embodiments of the present invention, it should be understood that the descriptions of the embodiments are illustrative of the invention and are not intended to be limiting. Various modifications and applications may occur to those skilled in the art without departing from the true spirit and scope of the invention as defined in the appended claims.

What is claimed is:

1. An apparatus for selecting one function from two functions, comprising:

a first entity having a host function, a device function, at least one detector and a function select mechanism, wherein the host function is associated with sending a first instruction and the device function is associated with operating the first entity in response to a second instruction;

a second entity having a device function, wherein the device function of the second entity is associated with operating the second entity in response to the first instruction and wherein the second entity does not have a host function; and an interface configured to connect the first entity and second entity, the interface being connected to the at least one detector;

wherein the at least one detector is configured to detect the device function of the second entity, and the function select mechanism is configured to select the host function from the host and device functions in the first entity in response to the detected function of the at least one detector.

2. The apparatus as defined in claim 1, wherein the at least one detector is two detectors.

3. The apparatus as defined in claim 1, wherein the detector includes a comparator.

4. The apparatus as defined in claim 2, wherein the two detectors each include a comparator.

5. The apparatus as defined in claim 1, wherein the function select mechanism includes a microprocessor.

6. The apparatus as defined in claim 1, wherein the function select mechanism includes a field programmable gate array or gate array.

7. An apparatus for selecting one function from two functions comprising:

a first entity having a host function, a device function, at least one detector and a function select mechanism;

a second entity having a host function, a device function, at least one detector and a function select mechanism; and an interface configured to connect the first entity and second entity, the interface being connected to the at least one detector;

wherein the at least one detector of the first entity is configured to detect a function of the second entity, and the function select mechanism of the first entity is configured to select one function from the host and device functions in the first entity in response to the detected function of the at least one detector of the first entity, and wherein the at least one detector of the second entity is configured to detect a function of the first entity, and the function select mechanism of the second entity is configured to select one function from the host and device functions in the second entity in response to the detected function of the at least one detector of the second entity.

8. The apparatus as defined in claim 7, wherein the interface is a Universal Serial Bus.

9. The apparatus as defined in claim 7, wherein the first entity and second entity are both a digital camera.

10. The apparatus as defined in claim 7, wherein the first entity is a digital camera and the second entity is a printer.

11. An apparatus for selecting one function from two functions, comprising:

a first entity having a first host function, a first device function, at least one detector and a function select mechanism, wherein the first host function is associated with sending a first instruction and the first device function is associated with operating the first entity in response to a second instruction;

a second entity having only one of a second host function and a second device function, wherein the second host function is associated with sending the second instruction to the first entity and the second device function is associated with operating the second entity in response to the first instruction; and an interface configured to connect the first entity and second entity, the interface being connected to the at least one detector;

wherein the at least one detector is configured to detect the function of the second entity, and the function select mechanism is configured to select one function from the first host and device functions in the first entity in response to the detected function of the at least one detector.

12. A method of selecting one function from a first function and a second function in a first entity, and with respect to a second entity, in data communication with the first entity, that has at least one of the first and second functions, the method comprising:

activating a first power source to the first entity;

connecting the first entity to the second entity via an interface;

detecting at least one voltage on the interface by connecting a first resistor between the interface and a second power source;

determining first if the detected voltage is over a threshold;

if so, connecting a second resistor between the interface and the ground;

detecting a divided voltage derived from the second power source and a ratio of the second resistor to the second resistor plus the first resistor;

determining second if the detected divided voltage is over the threshold;

if so, selecting the first function;

if the detected voltage is not over the threshold at the first determination, deactivating the first power source;

connecting a third resistor between the interface and the second power source;

waiting for a specified packet to be sent; and if the packet is received, selecting the second function.

13. The method as defined in claim 12, wherein each of the first function and the second function comprises one of a host function and a device function.

* * * * *